United States Patent
Park

(10) Patent No.: US 7,860,426 B2
(45) Date of Patent: Dec. 28, 2010

(54) IMAGE FORMING APPARATUS TO DETECT A POWER MALFUNCTION AND CONTROL METHOD THEREOF

(75) Inventor: Jae-sung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 11/843,703

(22) Filed: Aug. 23, 2007

(65) Prior Publication Data

US 2008/0159759 A1 Jul. 3, 2008

(30) Foreign Application Priority Data

Dec. 29, 2006 (KR) .................. 10-2006-0138264

(51) Int. Cl.
 *G03G 15/00* (2006.01)
(52) U.S. Cl. ..................................... 399/88
(58) Field of Classification Search .......... 399/33, 399/88
See application file for complete search history.

(56) References Cited

U.S. PATENT DOCUMENTS 6,573,482 B2 * 6/2003 Mokuo ................ 219/481
7,266,314 B2 * 9/2007 Takami ................. 399/33
7,284,365 B2 * 10/2007 Abe ...................... 60/277
2005/0047810 A1 * 3/2005 Nagatsuma et al. ....... 399/69

FOREIGN PATENT DOCUMENTS

| JP | 09197892 A * | 7/1997 |
| JP | 11-109785 | 4/1999 |
| JP | 2000-137394 | 5/2000 |
| JP | 2004-138639 | 5/2004 |
| KR | 1997-50138 | 8/1997 |

* cited by examiner

*Primary Examiner*—Quana M Grainger
(74) *Attorney, Agent, or Firm*—Stanzione & Kim, LLP

(57) ABSTRACT

An image forming apparatus includes a heat radiation unit to emit heat by an operating power supplied to the heat radiation unit, a switching unit to supply the heat radiation unit with the operating power, a relay unit to control the operating power to be supplied to the switching unit, a malfunction detector to detect whether the operating power is being supplied to the heat radiation unit and to output a malfunction signal corresponding to the switching unit or the relay unit if the power is not supplied thereby denoting a malfunction, and a controller to output an off-signal to at least one of the switching unit and the relay unit if the malfunction signal is received from the malfunction detector.

25 Claims, 5 Drawing Sheets

IMAGE FORMING APPARATUS TO DETECT A POWER MALFUNCTION AND CONTROL METHOD THEREOF

CROSS-REFERENCE TO RELATED APPLICATIONS

This application claims priority under 35 U.S.C. 119(a) from Korean Patent Application No. 10-2006-0138264, filed on Dec. 29, 2006, in the Korean Intellectual Property Office, the disclosure of which is incorporated herein in its entirety by reference.

BACKGROUND OF THE INVENTION

1. Field of the Invention

The present general inventive concept relates to an image forming apparatus and a control method thereof, and more particularly, to an image forming apparatus which can detect malfunction of a switching unit or relay unit and a control method thereof.

2. Description of the Related Art

A conventional image forming apparatus that uses an electrophotographic method includes a fixing unit that fixes an image transferred on a printing medium. The fixing unit includes a heating roller, a pressurization roller and a lamp. Therefore, a surface of the heating roller is heated by heat emitted from the lamp, and the image transferred on the printing medium is fixed to the printing medium by mutual compression between the pressurization roller and the heating roller.

The conventional image forming apparatus using the electrophotographic method generally uses a triac (TRIode for Alternating Current; TRIAC) to supply an operating voltage to the lamp. Since more heat is needed in a high speed device than a low speed device, more electric current flows through the triac. Accordingly, the heat generated from the triac is increased and thus raises a temperature of the triac. However, a triac thermal runaway feature of a continuous ON state regardless of an external control signal occurs at temperatures higher than about 120°.

If a heat radiating plate for the triac is designed to be large to radiate the heat, the thermal runaway can be prevented beforehand, but frequently a spatial restriction etc., does not allow an enough margin. If the heat is not radiated properly, the triac keeps the ON state continuously regardless of the external control signal, and the lamp of the fixing unit is continuously supplied with the operating voltage. As a result, the temperature of the triac continues to ascend. Therefore, the fixing unit may be damaged due to the heat from high temperature or other problems may occur due to the temperature rise of the triac.

SUMMARY OF THE INVENTION

The present general inventive concept provides an image forming apparatus which can detect a malfunction of a unit which supplies an operating voltage to a heat radiation unit, and a control method thereof.

The present general inventive concept also provides an image forming apparatus which can prevent a fixing unit from being damaged due to high thermal heat or an accident from being caused due to a temperature rise beforehand, and a control method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing an image forming apparatus comprising a heat radiation unit to emit heat by an operating power supplied to the heat radiation unit, a switching unit to supply the heat radiation unit with the operating power, a relay unit to control the operating power to be supplied to the switching unit, a malfunction detector to detect whether the operating power is being supplied to the heat radiation unit and to output a malfunction signal corresponding to the switching unit or the relay unit if the power is not supplied thereby denoting a malfunction, and a controller to output an off-signal to at least one of the switching unit and the relay unit if the malfunction signal is received from the malfunction detector.

The malfunction signal may be output from a photocoupler in the malfunction detector.

A plurality of diodes may be arranged so that the operating power can be bidirectionally conducted in the malfunction detector.

The malfunction detector may be provided between the switching unit and the relay unit to detect the malfunction of both of the switching unit and the relay unit.

The image forming apparatus may further comprise an alarm unit, wherein the controller controls the alarm unit to alarm the malfunction of the switching unit or the relay unit.

The alarm unit may comprise a display unit, and the controller may control the malfunction of the switching unit or the relay unit to be displayed on the display unit.

The controller may comprise a first transistor to drive the relay unit, and a logic gate to receive the malfunction signal to then be output to a base of the first transistor.

The switching unit may comprise a triac (TRIode for Alternating Current; TRIAC).

The image forming apparatus may further comprise a temperature detector to detect a temperature of the heat radiation unit, wherein the controller outputs an off-signal respectively to the switching unit and the relay unit when the temperature detected by the temperature detector is equal to or higher than a critical temperature.

The controller may compare the temperature detected by the temperature detector with a reference temperature to then drive the switching unit.

The image forming apparatus may further comprise a fixing unit to fix an image transferred on a printing medium, and the heat radiation unit may be provided in the fixing unit.

The foregoing and/or other aspects and utilities of the present general inventive concept can also be achieved by providing a control method of controlling an image forming apparatus, comprising a heat radiation unit, a switching unit to supply an operating power to the heat radiation unit and a relay unit to control the operating power to be supplied to the switching unit, the control method comprising detecting whether the operating voltage is supplied to the heat radiation unit and outputting a malfunction signal corresponding to the switching unit or the relay unit if the power is not supplied thereby denoting a malfunction, and outputting an off-signal to at least one of the switching unit and the relay unit if the malfunction signal is received.

The outputting of the malfunction signal may be outputted from a photocoupler.

The image forming apparatus may further comprise an alarm unit, the method further comprising alarming the malfunction of the switching unit or the relay unit when the malfunction signal is received.

The alarm unit may comprise a display unit, and the alarming the malfunction may comprise displaying the malfunction of the switching unit or the relay unit on the display unit.

The image forming apparatus may comprise a logic gate, and the outputting the off-signal may further comprise receiving the malfunction signal via an input terminal of the logic gate to turn off a relay contact point in the relay unit.

The image forming apparatus may further comprise a temperature detector to detect a temperature of the heat radiation unit, the method further comprising driving the switching unit through comparing a voltage detected from the temperature detector with a reference voltage.

The control method may further comprise outputting an off-signal respectively to the switching unit and the relay unit when the detection temperature detected by the temperature detector is equal to or higher than a critical temperature.

The foregoing and/or other aspects and utilities of the present general inventive concept can also be achieved by providing an image forming apparatus, comprising a heat radiation unit to emit heat, a unit to supply an operating power from a power supply unit to the heat radiation unit to generate the heat, and a controller to control the unit to terminate the supply of the operating power according to a state of the unit.

The state of the unit may comprise an electrical connection between the unit and the hear radiation unit.

The controller may control the unit according to a temperature of the heat radiation unit.

The image forming apparatus may further comprise a detector having a photocoupler connected between the unit and the controller to detect the state of the unit.

The unit may comprises a switching unit having a photocoupler to supply the operation power to the heat radiation unit, and a relay unit having another photocoupler to control a connection between the switching unit and the heat radiation unit.

The foregoing and/or other aspects and utilities of the present general inventive concept can also be achieved by providing an image forming apparatus, comprising a heat radiation unit to generate heat according to an operating power, a switching unit having a triac to transmit the operating power to heat the radiation unit, a relay unit to control supply of the operating power between the switching unit and the heat radiation unit, and a controller to control the relay unit and the switching unit according to a determination of whether the operating power is supplied to the heat radiation unit.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings in which.

DETAILED DESCRIPTION OF THE PREFERRED EMBODIMENTS

Figure 1:
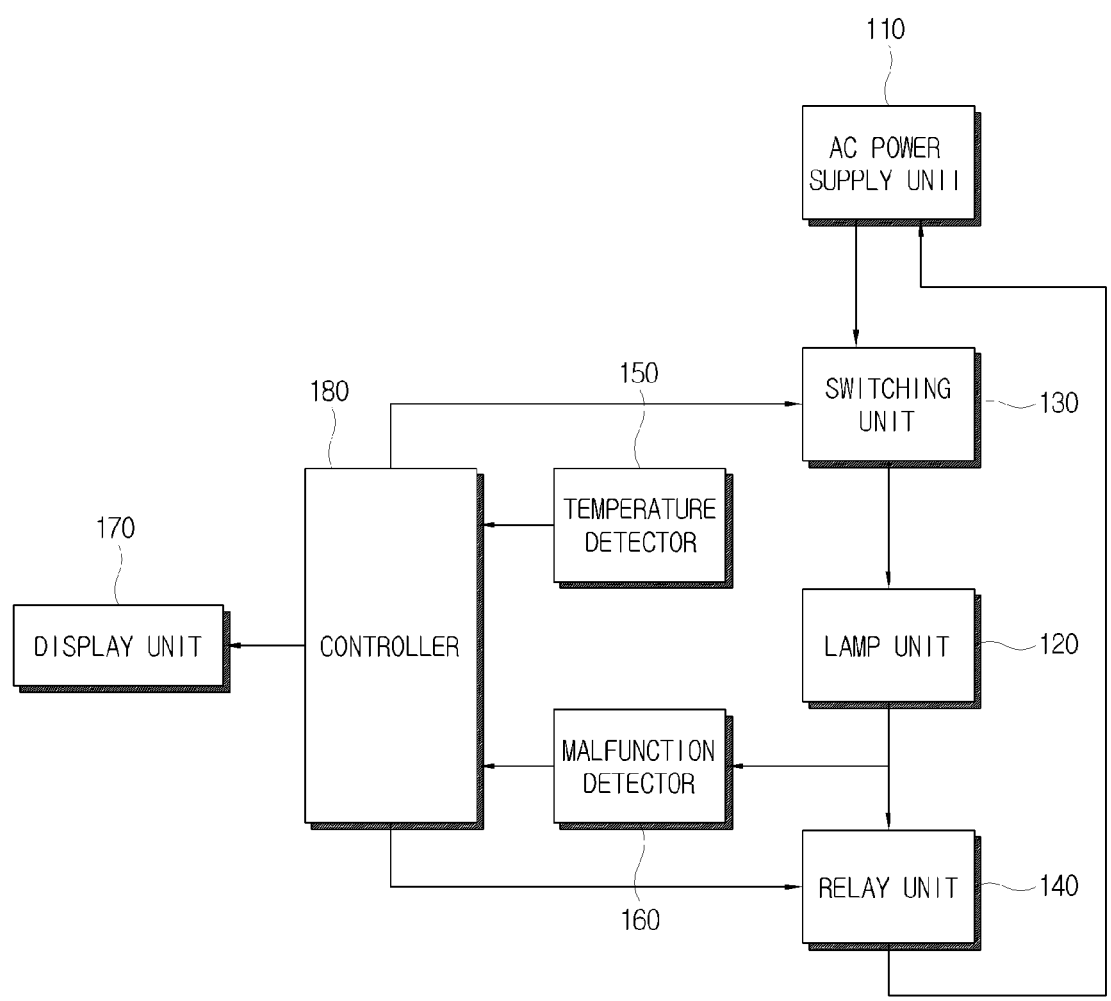
FIG. 1 is a block diagram illustrating a configuration of an image forming apparatus according to an exemplary embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating a configuration of an image forming apparatus 100 according to an exemplary embodiment of the present general inventive concept.

The image forming apparatus 100 illustrated in FIG. 1 includes an alternating-current (AC) power supply unit 110, a lamp unit 120, a switching unit 130, a relay unit 140, a temperature detector 150, a malfunction detector 160, a display unit 170 and a controller 180.

The AC power supply unit 110 supplies an AC power to the lamp unit 120 of a fixing unit which is described according to an exemplary embodiment of the present general inventive concept. The AC power is provided in FIG. 1 according to an exemplary embodiment of the present general inventive concept, but a direct-current (DC) power may be also provided to the lamp unit 120, and thus, both the AC power and the DC power will be hereinafter referred to as an operating power.

The lamp unit 120 is a heat radiating unit which radiates heat if an operating voltage is supplied, that is, the lamp unit 120 generates the heat and heats a surface of a heating roller in a fixing unit in order to fix an image transferred on a printing medium.

The switching unit 130 supplies the operating power for the lamp unit 120 if an on-signal is output from the controller 180. A triac (TRIode for Alternating Current; TRIAC) is used as a switching element corresponding to the switching unit 130, according to an exemplary embodiment of the present general inventive concept. The triac is a semiconductor device to perform switching operations, and including five substrate layers of P-N-P-N-P. The triac is turned on and/or off according to a voltage which is supplied to a third control electrode in addition to the electrodes of both ends, that is, a gate electrode.

The relay unit 140 controls the operating power which is supplied to the switching unit 130. That is, if the controller 180 outputs a driving voltage to turn on the relay unit 140, a relay contact point in the relay unit 140 is moved to maintain an on-state of the operating power which is supplied to the switching unit 130, and if the controller 180 outputs a cut-off voltage to turn off the relay unit 140, the relay contact point in the relay unit 140 is moved to maintain an off-state thereof.

The temperature detector 150 is attached to the lamp unit 120 and detects temperature of the lamp unit 120. Although the temperature detector 150 is not illustrated in FIG. 2, the temperature includes a thermistor to detect temperature of the lamp unit 120. The controller 180 outputs a turn-on and/or turn-off signal to turn the switching unit 130 and the relay unit 140 on and/or off, based on the detected temperature which is detected by the temperature detector 150. That is, if the detection temperature detected by the temperature detector 150 is not lower than a critical temperature, for example, 180° or higher, the controller 180 outputs the off-signal which turns off the switching unit 130 or the off-signal which turns off the relay unit 140.

The malfunction detector 160 detects whether the operating power is supplied to the lamp unit 130, to thereby output a malfunction signal to the switching unit 130 or the relay unit 140. Meanwhile, although it is not illustrated in FIGS. 1 and 2, the malfunction detector 160 may be connected with a node between the switching unit 130 and the relay unit 140 to thereby detect malfunctions of both the switching unit 130 and the relay unit 140.

The display unit 170 is a user interface device and displays information regarding malfunction of the switching unit 130 or the relay unit 140, according to a control signal of the controller 180, in order to inform a user of the malfunction of the switching unit 130 or the relay unit 140. The display unit 170 illustrated in FIG. 1 may be any element which informs a user that the switching unit 130 and/or the relay unit 140 malfunction. In other words, the displaying unit 170 can include, but is not limited to, monitors, LCD screens, Diodes, etc.

If the controller 180 judges that the malfunction signal output from the malfunction detector 160 represents that the switching unit 130 or the relay unit 140 malfunctions, the controller 180 outputs the off-signals to the switching unit 130 and the relay unit 140, respectively, and controls the display unit 170 to display that the switching unit 130 or the relay unit 140 malfunctions.

Figure 2:
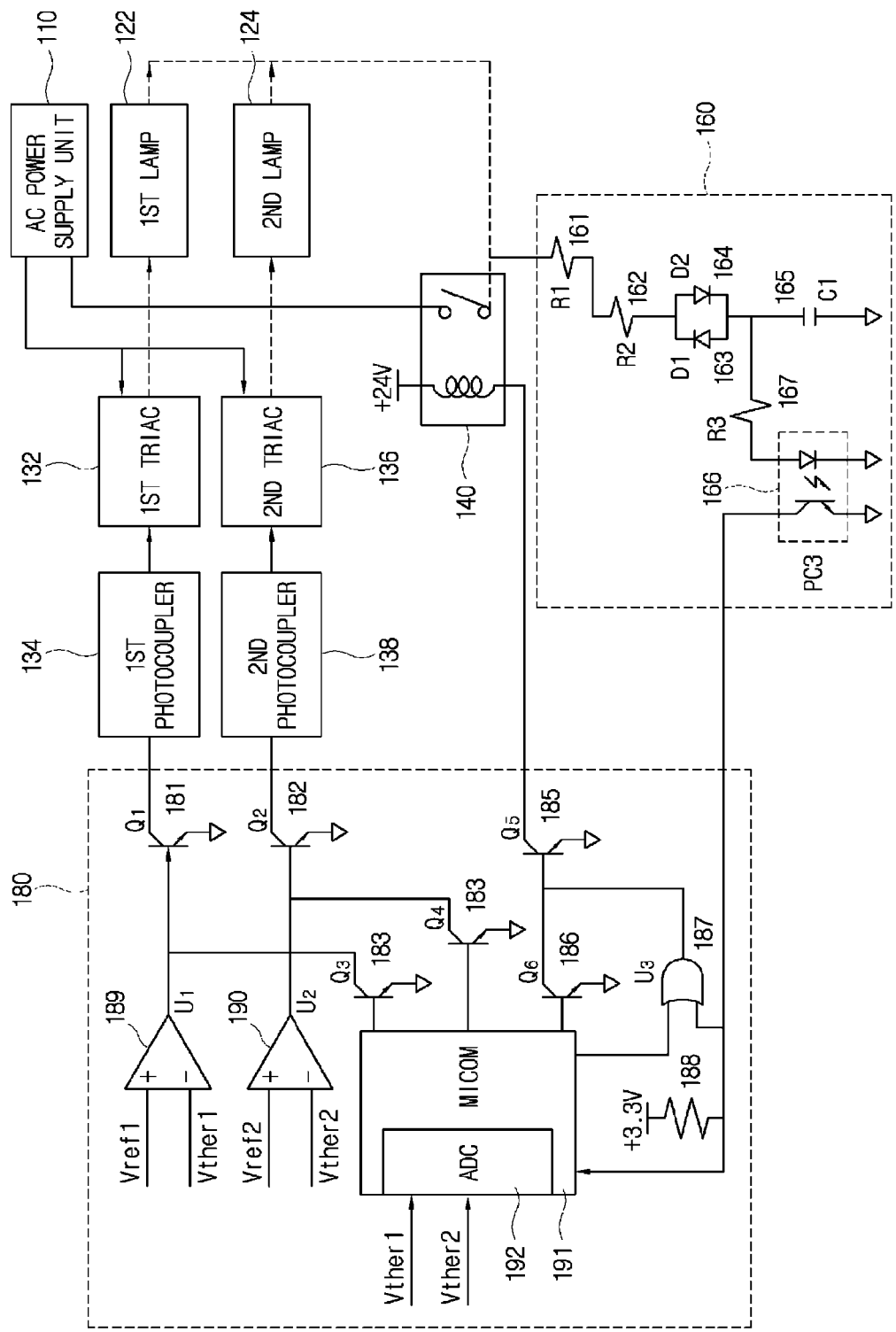
FIG. 2 is a block diagram illustrating a detailed configuration of an image forming apparatus according to an exemplary embodiment of the present general inventive concept.

FIG. 2 is a block diagram illustrating a configuration of the image forming apparatus 100 in detail according to an exemplary embodiment of the present general inventive concept.

As illustrated in FIG. 2, the image forming apparatus 100 includes the lamp unit 120 having a first lamp 122 and a second lamp 124. Therefore, the switching unit 130 includes a first triac (TRIode for Alternating Current; TRIAC) 132 and a second triac (TRIode for Alternating Current; TRIAC) 136 which respectively drive the first lamp 122 and the second lamp 124, and a first photocoupler 134 and a second photocoupler 138 which respectively drive the first triac 132 and the second triac 136.

The malfunction detector 160 includes a resistor (R1) 161, a resistor (R2) 162, a diode (D1) 163, a diode (D2) 164, a capacitor (C1) 165, a resistor (R3) 167, and a third photocoupler (PC3) 166. (Here, the resistor (R1) 161 is connected in series with the resistor (R2) 162. The diode (D1) 163 and the diode (D2) 164 which form a diode coupler are connected in parallel with each other and are positioned in a counter direction with respect to the resistor (R2) 162. The capacitor (C1) 165 is connected in series with the diode (D1) 163 and the diode (D2) 164. The resistor (R3) 167 is connected to a node between the diode coupler and the capacitor (C1) 165, and is connected in series with the third photocoupler (PC3) 166.

The controller 180 includes a first transistor (Q1) 181, which produces a gate driving signal of the first triac 132, and a second transistor (Q2) 182, which produces a gate driving signal of the second triac 136. A base of the first transistor (Q1) 181 is coupled to both an output terminal of a first comparator (U1) 189 and a collector of a third transistor (Q3) 183, which is activated by a voltage across an output terminal of a microcomputer (MICOM) 191. In addition, a base of the second transistor (Q2) 182 is coupled to an output terminal of a second comparator (U2) 190 and a collector of a fourth transistor (Q4) 184, which is activated by a voltage across an output terminal of the microcomputer (MICOM) 191.

A detection voltage Vther1 input into the first comparator (U1) 189 and a detection voltage Vther2 input into the second comparator (U2) 190 are output voltages which are output from the temperature detector 150 which detects the respective ambient temperatures of the first lamp 122 and the second lamp 124. In addition, a reference voltage Vref1 input into the first comparator (U1) 189 and a reference voltage Vref2 input into the second comparator (U2) 190 are reference voltages which control ambient temperatures of the first lamp 122 and the second lamp 124 not to exceed limit temperatures.

The controller 180 includes a fifth transistor (Q5) 185 which drives the relay unit 140. A base of the fifth transistor (Q5) 185 is connected to a collector of a sixth transistor (Q6) 186, which is activated by a voltage across an output terminal of the microcomputer (MICOM) 191 and an output terminal of an OR gate (U3) 187, which receives a voltage from an output terminal of the microcomputer (MICOM) 191 and a signal output from the malfunction detector 160.

In addition, the controller 180 includes a pull-up resister (R4) 188 to supply power to a light receiving element of the third photocoupler (PC3) 166. Meanwhile, the controller 180 includes an analog-to-digital converter (ADC) 192 in the microcomputer (MICOM) 191.

The operation of the image forming apparatus according to the exemplary embodiment of the present general inventive concept will be described below with reference to FIGS. 1 and 2.

If the image forming apparatus 100 starts a printing operation, the microcomputer (MICOM) 191 outputs a signal to activate the fifth transistor (Q5) 185. That is, the microcomputer (MICOM) 191 outputs zero (0) (hereinafter referred to as a low voltage) to a base of the sixth transistor (Q6) 186, and outputs one (1) (hereinafter referred to as a high voltage) to an input terminal of the OR gate (U3) 187. Therefore, the sixth transistor (Q6) 186 maintains an off-state, and the OR gate (U3) 187 outputs the high voltage. Accordingly, the fifth transistor (Q5) 185 is activated. As a result, electric current flows through a coil in the relay unit 140, and the relay contact point in the relay unit 140 moves to provide an on-state.

In addition, the microcomputer (MICOM) 191 outputs signals to activate the first transistor (Q1) 181 and the second transistor (Q2) 182. That is, the microcomputer (MICOM) 191 outputs the low voltage to respective bases of the third transistor (Q3) 183 and the fourth transistor (Q4) 184. Therefore, the first transistor (Q1) 181 is activated and the first photocoupler 134 is activated. Thus, the gate voltage is supplied to the gate of the first triac 132, and the first triac 132 is activated. Furthermore, the second transistor (Q2) 182 is activated and the second photocoupler 138 is activated. Thus, the gate voltage is supplied to the gate of the first triac 132, and the second triac 136 is activated.

Since the relay contact point in the relay unit 140 is maintained the on-state, and the first triac 132 and the second triac 136 are activated, the operating power supplied from the AC power supply unit 110 is supplied to the first lamp 122 and the second lamp 124 to thereby generate heat.

If the detection voltage from the temperature detector 150 that detects an ambient temperature of the first lamp 122 increases more than the reference voltage Vref1 since the ambient temperature of the first lamp 122 rises up, the voltage output from the first comparator (U1) 189 becomes the low voltage. Therefore, the first transistor (Q1) 181 is shifted into an off-state by the low voltage output from the first comparator (U1) 189, and the first photocoupler 134 is also turned off. Then, the gate voltage across the gate of the first triac 132 is cut off, and the electric current flowing through the first triac 132 is cut off to turn off the first triac 132. Accordingly, the ambient temperature of the first lamp 122 decreases since the operating power is not supplied to the first lamp 122.

Likewise, if the detection voltage from the temperature detector 150 that detects an ambient temperature of the second lamp 124 increases more than the reference voltage Vref2 since the ambient temperature of the second lamp 124 increases, the voltage output from the second comparator (U2) 190 becomes the low voltage. Therefore, the second transistor (Q2) 182 is shifted into an off-state by the low voltage output from the second comparator (U2) 190, and the second photocoupler 138 is also turned off. Then, the gate voltage across the gate of the first triac 132 is cut off and the electric current flowing through the second triac 136 is cut off to turn off the second triac 136. Accordingly, the ambient temperature of the second lamp 124 decreases since the operating power is not supplied to the second lamp 124.

Also, the microcomputer (MICOM) 191 receives the detection voltage output from the temperature detector 150, and then digitizes the received detection voltage via an analog-to-digital converter (ADC) 192 in the microcomputer (MICOM) 191. Then, the microcomputer (MICOM) 191 compares a temperature corresponding to the digitized result with a predetermined critical temperature, for example, 180°. If the detected digitized temperature from the temperature detector 150 exceeds the critical temperature, the microcomputer (MICOM) 191 outputs the high voltage to the respective bases of the third transistor (Q3) 183 and the fourth transistor (Q4) 184, and the sixth transistor(Q6) 186, and outputs the low voltage to the input terminal of the OR gate (U3) 187. Accordingly, since the third transistor (Q3) 183 and the fourth transistor (Q4) 184 are activated, the first transistor (Q1) 181 and the second transistor (Q2) 182 are turned off. Therefore, the first triac 132 and the second triac 136 are turned off, and thus the operating powers which are supplied to the first lamp 122 and the second lamp 124 are cut off. Also, since the fifth transistor (Q5) 185 is also turned off, and the electric current flowing through the relay unit 140 is cut off by the control of the microcomputer (MICOM) 191, the relay contact point is shifted into an off-state. Accordingly, the operating powers respectively supplied to the first lamp 122 and the second lamp 124 are cut off.

Meanwhile, if the first triac 132, the second triac 136 and the relay unit 140 are all turned off, an electric current does not flow in the resistor (R1) 161, the resistor (R2) 162, the diode (D1) 163 and the diode (D2) 164. Accordingly, the electric current does not flow in the light emitting element of the third photocoupler (PC3) 166 in the malfunctions detector 160. As a result, the high voltage across the output terminal of the third photocoupler (PC3) 166 is input to the microcomputer (MICOM) 191, and thus the microcomputer (MICOM) 191 judges that the first triac 132, the second triac 136 and the relay unit 140 have been normally turned off.

However, if the temperature of the first lamp 122 and the second lamp 124 ascend and exceed the critical temperature, the controller 180 outputs an off-signal respectively to the first triac 132 and the second triac 136 to cut off the operating power supplied to the first lamp 122 and the second lamp 124. However, if a thermal runaway occurs in the first triac 132 or the second triac 136, and thus the first triac 132 or the second triac 136 is maintained in an on-state, the first lamp 122 or the second lamp 124 radiates heat continuously to raise the ambient temperature thereof. Accordingly, since the electric current flows through the resistor (R1) 161, the resistor (R2) 162, the diode (D1) 163, and the diode (D2) 164 in the malfunction detector 160, the capacitor (C1) 163 is electrically charged. Since the electric current passes through the resistor (R3) 167, the light emitting element of the third photocoupler (PC3) 166 emits a light. Then, since the light receiving element of the third photocoupler (PC3) 166 receives light, the low voltage is output from the output terminal of the third photocoupler (PC3) 166.

Figure 4A:
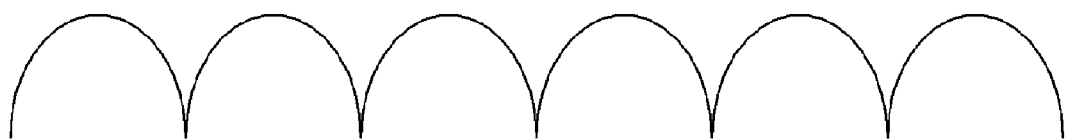
FIGS. 4A and 4B are waveform outputs from a malfunction detector according to an exemplary embodiment of the present general inventive concept.
Figure 4B:
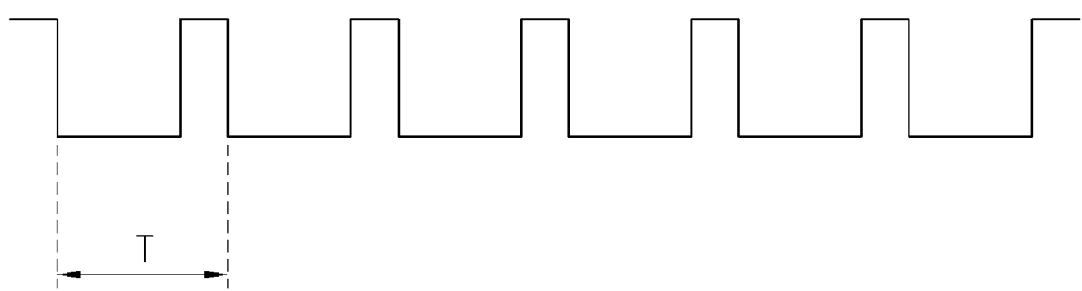

Examples of waveforms of output powers from the malfunction detector 160 of FIG. 2 are illustrated in FIGS. 4A and 4B. FIG. 4A illustrates a rectification waveform flowing through the capacitor (C1) 165 and FIG. 4B illustrates a detected operation waveform which is input into the microcomputer (MICOM) 191. Additionally, a waveform at an output terminal of the light receiving element in the third photocoupler (PC3) 166, a width of the low voltage can be designed differently according to the value of the resistor (R1) 161, the resistor (R2) 162 and the capacitor (C1) 165. If the capacity of the capacitor (C1) 165 is designed to have a large valve, a waveform of the low voltage is output continuously.

If the microcomputer (MICOM) 191 receives the malfunction signal output from the malfunction detector 160, it judges that an error has been generated to thereby output an off-signal to the relay unit 140 and thus cut off an electric current flowing through the relay unit 140. In addition, the microcomputer (MICOM) 191 outputs continuously an off-signal to the first triac 132 and the second triac 136. That is, since the relay contact point in the relay unit 140 is shifted into an off-state, the electric current does not flow through the relay unit 140 even if the first triac 132 or the second triac 136 has been conducted by the thermal runaway. Accordingly, the ambient temperature of the first triac 132 or the second triac 136 decreases, and thus the first triac 132 or the second triac 136 can be normally operated after a predetermined time elapses.

Since the first triac 132 or the second triac 136 is maintained at an on-state even if the relay unit 140 is turned off, the malfunction signal, which is similar to that of FIG. 4, is continuously output to the malfunction detector 150 during the predetermined time period. If the malfunction signal is continuously input from the malfunction detector 150, even after the predetermined time has elapsed, the microcomputer (MICOM) 191 controls the display unit 170 to display that a short-circuit breakdown failure has occurred in the first triac 132 or the second triac 136.

Meanwhile, if small resistance values are selected corresponding to the resistor (R1) 161 and the resistor (R2) 162 in the malfunction detector 160, and a large capacitance value is selected corresponding to the capacitor (C1) 165, the light receiving element of the third photocoupler (PC3) 166 can be continuously maintained at the conduction state. Accordingly, the low voltage output from the third photocoupler (PC3) 166 is input into the OR gate (U3) 187, and thus the low voltage is output to the output terminal of the OR gate (U3) 187. Accordingly, the fifth transistor (Q5) 185 can be turned off. As a result, even if the microcomputer (MICOM) 191 and other elements malfunction, the relay unit 140 can be cut off by hardware to enable multi-sided protection.

Also, if the detection element and in the temperature detector 150 malfunction and the detection voltage output from the temperature detector 150 continuously maintains a state higher than the reference voltage Vref1 or the reference voltage Vref2, the output of the first comparator (U1) 169 or the second comparator (U2) 190 keeps the high voltage and the detection voltages Vther1 and Vther2 input into the microcomputer (MICOM) 191 maintain the error voltage. Accordingly, the first lamp 122 or the second lamp 124 is continuously heated. In this case, the malfunction detector 160 detects an electric current flowing through the first lamp 122 or the second lamp 124. If the electric current flows through the first lamp 122 or the second lamp 124 continuously for a predetermined time or longer, the malfunction signal can be output from the malfunction detector 160. The microcomputer (MICOM) 191 outputs the high voltage to the base of the sixth transistor (Q6) 186 based on the malfunction signal, and outputs the low voltage to the input terminal of the OR gate (U3) 187. Thus, the fifth transistor (Q5) 185 is turned off and the electric current flowing through the relay unit 140 is cut off. As a result, the relay contact point in the relay unit 140 moves to maintain an off-state, and the operating power supplied to the first lamp 122 and the second lamp 124 is cut off.

Figure 3:
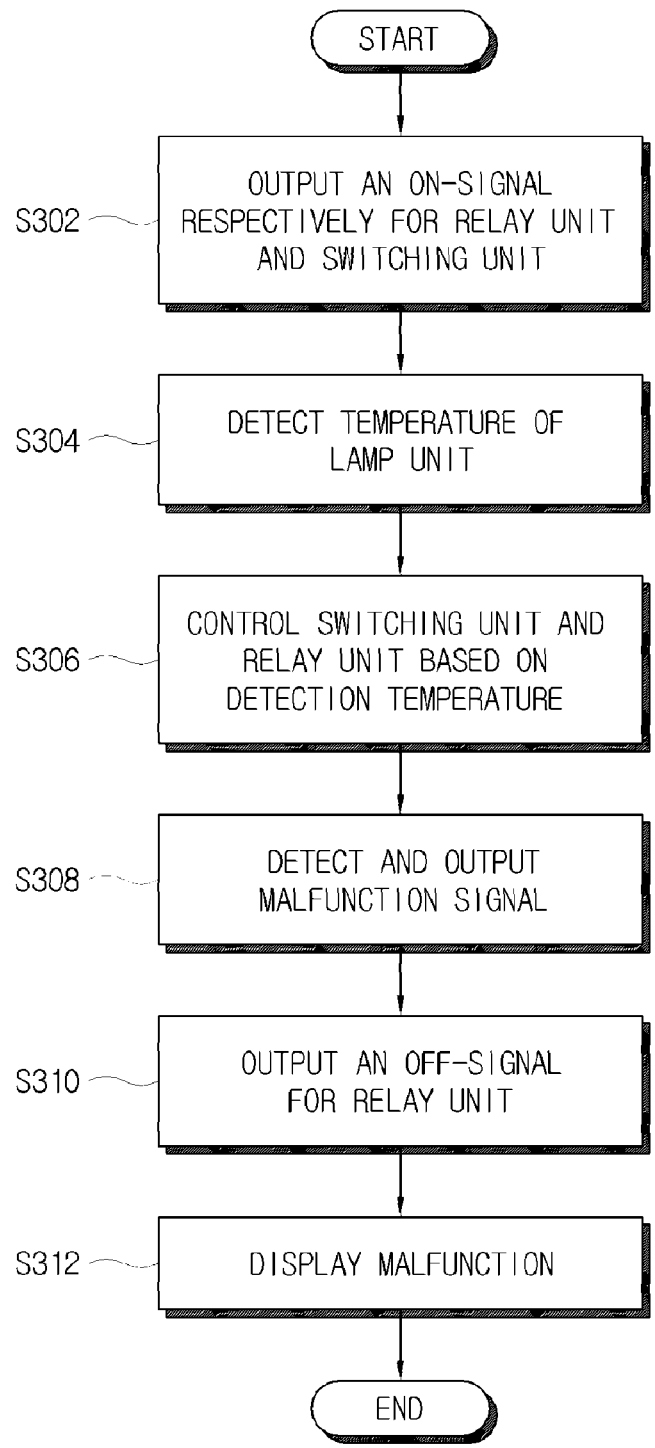
FIG. 3 is a flowchart illustrating a control method of controlling an image forming apparatus according to an exemplary embodiment of the present general inventive concept.

FIG. 3 is a flowchart illustrating a control method of controlling an image forming apparatus according to an exemplary embodiment of the present general inventive concept.

If printing starts in the image forming apparatus, the controller 180 outputs an on-signal to drive the relay unit 140, and then outputs an on-signal to drive the switching unit 130 in operation S302. Accordingly, the operating power is supplied to the lamp unit 120 and thus the lamp unit 120 is heated.

If the lamp unit 120 is heated, a resistance value of a thermistor used in the temperature detector 150 is changed and the detection voltage based on the temperature of the lamp unit 120 is output from the temperature detector 150 in operation S304. The controller 180 controls the switching unit 130 and the relay unit 140, based on the input detection voltage in operation S306. The controller 180 compares the reference voltage with the detection voltage output from the temperature detector 150, and turns on and/or off the switching unit 130 to thereby keep the temperature of the lamp unit 120 constant. However, the controller 180 receives the detection voltage output from the temperature detector 150 and digitizes the received detection voltage via the analog-to-digital converter (ADC) 192, to thereby obtain a corresponding temperature. Then, if the corresponding temperature is higher than a critical temperature, the controller 180 outputs an off-signal to the switching unit 130 and the relay unit 140.

Meanwhile, the malfunction detector 160 may be provided at a node between the switching unit 130 and the relay unit 140, to thus detect an operating power supplied to the lamp unit 120. If the controller 180 outputs an off-signal to the switching unit 130, but a malfunction occurs such that the operating voltage is continuously supplied to the lamp unit 120 due to a failure of the switching unit 130, the malfunction detector 160 detects the malfunction of the switching unit 130 and outputs the malfunction signal in operation S308.

If the controller 180 receives the malfunction signal, it outputs the off-signal to the relay unit 140 in operation S310 and controls the display unit 170 to display that the switching unit 130 malfunctions in operation S312.

As described above, the present general inventive concept provides an image forming apparatus which can detect malfunction of a device which supplies an operating power to a heat radiation unit, and a control method thereof.

In addition, the present general inventive concept provides an image forming apparatus which can prevent a fixing unit from being damaged due to high thermal heat or an accident from being caused due to a temperature rise beforehand, and a control method thereof.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power control unit of an image forming apparatus, comprising:
   a heat radiation unit to emit heat by an operating power supplied to the heat radiation unit;
   a switching unit to supply the heat radiation unit with the operating power;
   a relay unit to control the operating power to be supplied to the switching unit;
   a malfunction detector to detect whether the operating power is being supplied to the heat radiation unit and outputs a malfunction signal corresponding to the switching unit or the relay unit if the power is not supplied thereby denoting a malfunction; and
   a controller to output an off-signal to at least one of the switching unit and the relay unit if the malfunction signal is received from the malfunction detector.

2. The power control unit according to claim 1, wherein the malfunction signal is output from a photocoupler in the malfunction detector.

3. The power control unit according to claim 2, wherein a plurality of diodes are arranged so that the operating power can be bidirectionally conducted in the malfunction detector.

4. The power control unit according to claim 3, wherein the malfunction detector is provided between the switching unit and the relay unit to detect the malfunction of both of the switching unit and the relay unit.

5. The power control unit according to claim 1, further comprising:
   an alarm unit,
   wherein the controller controls the alarm unit to alarm the malfunction of the switching unit or the relay unit.

6. The power control unit according to claim 5, wherein the alarm unit comprises a display unit; and
   the controller controls the malfunction of the switching unit or the relay unit to be displayed on the display unit.

7. The power control unit according to claim 1, wherein the controller comprises:
   a first transistor to drive the relay unit; and
   a logic gate to receive the malfunction signal to then be output to a base of the first transistor.

8. The power control unit according to claim 1, wherein the switching unit comprises:
   a triac (TRIode for Alternating Current; TRIAC).

9. The power control unit according to claim 1, further comprising:
   a temperature detector to detect a temperature of the heat radiation unit,
   wherein the controller outputs an off-signal respectively to the switching unit and the relay unit when the temperature detected by the temperature detector is equal to or higher than a critical temperature.

10. The power control unit according to claim 9, wherein the controller compares the temperature detected by the temperature detector with a reference temperature to then drive the switching unit.

11. The power control unit according to claim 1, further comprising:
    a fixing unit to fix an image transferred on a printing medium, and the heat radiation unit is provided in the fixing unit.

12. A control method of controlling a power control unit of an image forming apparatus comprising a heat radiation unit, a switching unit to supply an operating power to the heat radiation unit and a relay unit to control the operating power to be supplied to the switching unit, the control method comprising:
    detecting whether the operating voltage is supplied to the heat radiation unit and outputting a malfunction signal corresponding to the switching unit or the relay unit; and
    outputting an off-signal to at least one of the switching unit and the relay unit if the malfunction signal is received.

13. The control method of claim 12, wherein the outputting the malfunction signal comprises outputting the malfunction signal using a photocoupler.

14. The control method of claim 12, wherein:
    the image forming apparatus further comprises an alarm unit; and the method further comprises controlling the alarm unit to alarm the malfunction of the switching unit or the relay unit when the malfunction signal is received.

15. The control method of claim 12, wherein:
the alarm unit comprises a display unit; and
the alarming of the malfunction comprises displaying the malfunction of the switching unit or the relay unit on the display unit.

16. The control method of claim 12, wherein:
the image forming apparatus comprises a logic gate; and
the outputting of the off-signal further comprises receiving the malfunction signal via an input terminal of the logic gate in order to turn off a relay contact point in the relay unit.

17. The control method of claim 12, wherein:
the image forming apparatus further comprises a temperature detector to detect a temperature of the heat radiation unit; and
the method further comprises driving the switching unit through comparing a voltage detected from the temperature detector with a reference voltage.

18. The control method of claim 12, further comprising:
outputting an off-signal respectively to the switching unit and the relay unit when the detection temperature detected by the temperature detector is equal to or higher than a critical temperature.

19. A power control unit of an image forming apparatus, comprising:
a heat radiation unit to emit heat;
a unit to supply an operating power from a power supply unit to the heat radiation unit to generate the heat; and
a controller to control the unit to terminate the supply of the operating power according to a power state of the unit detected by a detector,
wherein the unit comprises:
    a switching unit having a photocoupler to supply the operation power to the heat radiation unit; and
    a relay unit having another photocoupler to control a connection between the switching unit and the heat radiation unit.

20. The power control unit according to claim 19, wherein the state of the unit comprises an electrical connection between the unit and the heat radiation unit.

21. The power control unit according to claim 19, wherein the controller controls the unit according to a temperature of the heat radiation unit.

22. The power control unit according to claim 19, wherein the detector includes a photocoupler connected between the unit and the controller to detect the state of the unit.

23. A power control unit of an image forming apparatus, comprising:
a heat radiation unit to generate heat according to an operating power;
a switching unit having a triac to transmit the operating power to heat the radiation unit;
a relay unit to control supply of the operating power between the switching unit and the heat radiation unit; and
a controller to control the relay unit and the switching unit according to a determination of whether the operating power is supplied to the heat radiation unit.

24. A fixing unit usable with an image forming apparatus having a control unit to control a power supply unit, the fixing unit comprising:
a heat radiation unit to receive operating power from the power supply unit according to a power state of the power supply unit detected by a detector and to generate heat according to the operating power from the power supply unit,
wherein the owe state comprises an electrical connection between the power supply unit and the heat radiation unit.

25. The fixing unit of claim 24, wherein the power supply unit comprises:
a switching unit to supply the heat radiation unit with the operating power; and
a relay unit to control the operating power to be supplied to the switching unit.

* * * * *